(12) United States Patent
Omi et al.

(10) Patent No.: US 8,807,886 B2
(45) Date of Patent: Aug. 19, 2014

(54) HOLE CUTTER

(75) Inventors: Shohei Omi, Anjo (JP); Yasuo Imai, Anjo (JP)

(73) Assignee: Omi Kogyo Co., Ltd., Anjo-Shi, Aichi-Ken (JP)

( * ) Notice: Subject to any disclaimer, the term of this patent is extended or adjusted under 35 U.S.C. 154(b) by 803 days.

(21) Appl. No.: 12/948,335

(22) Filed: Nov. 17, 2010

(65) Prior Publication Data
US 2012/0087755 A1 Apr. 12, 2012

(30) Foreign Application Priority Data

Oct. 8, 2010 (JP) .............................. 2010-006707 U

(51) Int. Cl.
*B23B 51/04* (2006.01)
*B23B 51/05* (2006.01)

(52) U.S. Cl.
USPC ......................................... 408/204; 408/206

(58) Field of Classification Search
USPC ......... 408/204, 206, 703, 223, 207, 224, 230, 408/227, 203.5, 226, 228, 229; 144/21, 23; 407/60, 56, 58, 59, 61, 64
See application file for complete search history.

(56) References Cited

U.S. PATENT DOCUMENTS

| | | | | |
|---|---|---|---|---|
| 3,765,789 A * | 10/1973 | Hougen | ........................ | 408/204 |
| 4,322,188 A | 3/1982 | Hougen | | |
| 4,452,554 A * | 6/1984 | Hougen | ........................ | 408/206 |
| 4,516,890 A * | 5/1985 | Beharry | ........................ | 408/204 |
| 4,538,944 A * | 9/1985 | Hougen | ........................ | 408/206 |
| 4,586,857 A * | 5/1986 | Ohmi | ............................ | 408/206 |
| 4,813,819 A * | 3/1989 | Hougen | ........................ | 408/1 R |
| 5,145,296 A * | 9/1992 | Hougen | ........................ | 408/1 R |
| 5,240,357 A * | 8/1993 | Omi | .............................. | 408/204 |
| 6,676,711 B2 | 1/2004 | Omi | | |
| 7,083,367 B2 * | 8/2006 | Delett | ............................ | 408/59 |
| 7,547,166 B2 * | 6/2009 | Nuzzi et al. | .................. | 408/233 |

(Continued)

FOREIGN PATENT DOCUMENTS

CN 201161310 Y 12/2008
DE 3130828 A1 8/1981

(Continued)

OTHER PUBLICATIONS

Office Action issued by the Chinese Patent Office pertaining to Chinese Patent Application No. 201010582609.6.

*Primary Examiner* — Eric A Gates
*Assistant Examiner* — Paul M Janeski
(74) *Attorney, Agent, or Firm* — Marsh Fischmann & Breyfogle LLP; Jonathon A. Szumny

(57) ABSTRACT

A hole includes a blade cylinder and at least one first blade portion and at least one second blade portion, which are arranged along the rotation direction at intervals. Each of the first and second blade portions includes an inside blade and an outside blade. In the first and second blade portions that are adjacent to each other along the rotation direction, the sum of the number of cutting edges of the outside blade and the cutting edge of the inside blade of the first blade is three or more, the sum of cutting edges of the outside blade and the cutting edge of the inside blade of the second blade is two or more, the number of the cutting edge of the first blade being different from the number of the cutting edges of the second blade.

9 Claims, 5 Drawing Sheets

(56) References Cited

U.S. PATENT DOCUMENTS

| | | | |
|---|---|---|---|
| 7,611,312 B2 | 11/2009 | Miyanaga | |
| 2007/0065244 A1* | 3/2007 | Miyanaga | 408/204 |
| 2009/0110501 A1* | 4/2009 | Drori et al. | 408/209 |

FOREIGN PATENT DOCUMENTS

| | | | | |
|---|---|---|---|---|
| GB | 2080711 A | * | 2/1982 | |
| JP | 5-42407 A | | 2/1993 | |
| JP | 5-154709 A | | 6/1993 | |
| JP | 2002103125 A | * | 4/2002 | |
| JP | 2002-370115 A | | 12/2002 | |
| JP | 2004074383 A | * | 3/2004 | |
| JP | 2005040918 A | | 2/2005 | |
| JP | 2007050477 A | * | 3/2007 | |
| JP | 2007260888 A | * | 10/2007 | |
| JP | 2008272852 A | * | 11/2008 | |
| JP | 4499037 B2 | | 4/2010 | |
| JP | 2012035397 A | * | 2/2012 | |

* cited by examiner

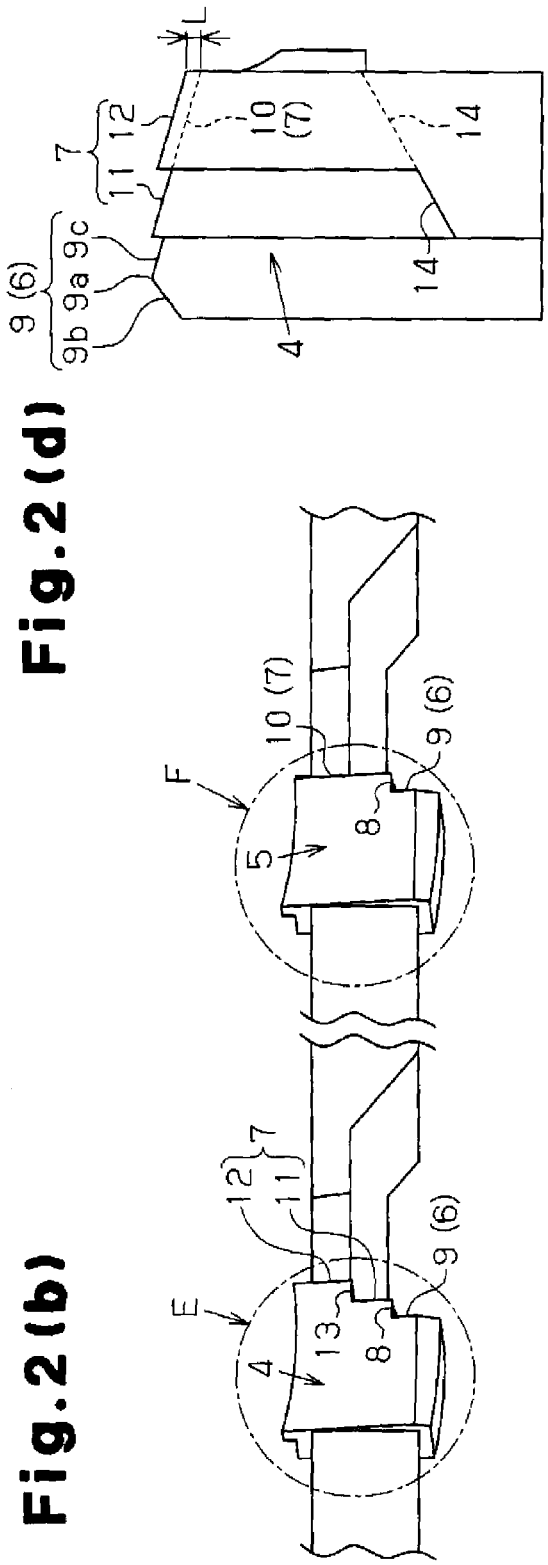
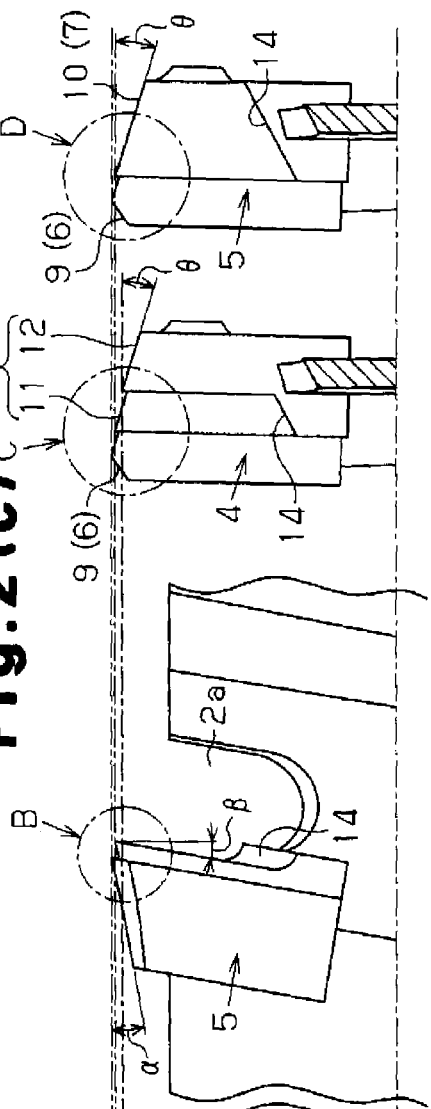
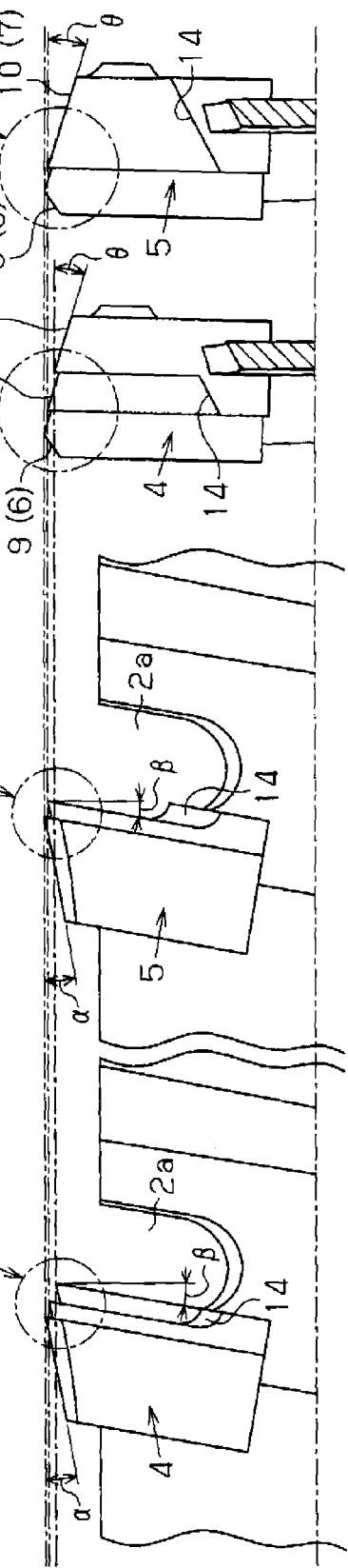

HOLE CUTTER

BACKGROUND OF THE INVENTION

The present invention relates to a hole cutter having a blade cylinder with a rotation axis and a plurality of blade portions, which are arranged along the rotational direction at intervals.

Conventional hole cutters disclosed in Japanese Laid-Open Patent Publication No. 5-42407 and Japanese Laid-Open Patent Publication No. 5-154709 include first and second blade portions, which are adjacent to each other. The first blade portion has two blades (an outside blade and an inside blade) with a stepped cutting edge in between, and the second blade portion has a single blade.

According to the hole cutter of the above publications, the inside blade of the first blade portion is displaced from the edge of the second blade portion along the direction of the rotation axis. This provides a non-cutting portion in the second blade portion, which rarely contributes to cutting operation. Also, the outside and inside blades of the first blade portion divide shavings. Accordingly, divided shavings having different thicknesses are smoothly discharged at different speeds. However, since the shavings are only parted into two strips, the shaving discharge performance is not sufficiently improved.

SUMMARY OF THE INVENTION

Accordingly, it is an objective of the present invention to provide a hole cutter that more smoothly discharges shavings.

To achieve the foregoing objective and in accordance with one aspect of the present invention, a hole cutter is provided that includes a blade cylinder, at least one first blade portion, and at least one second blade portion. The blade cylinder has a circular cross section and a rotation axis and a distal end. The first blade portion and the second blade portion are located at the distal end of the blade cylinder, and are arranged along the rotation direction at intervals. Each of the first and second blade portions includes an inside blade formed at a closer position to the rotation axis, an outside blade, and a stepped cutting edge. The outside blade is formed at a farther position from the rotation axis than the inside blade. The outside blade is displaced in the rotation direction relative to the inside blade. The stepped cutting edge connects the outside blade and the inside blade to each other. Each of the outside blade and the inside blade has one cutting edge that extends along a radial direction or a plurality of cutting edges that extend along the radial direction and are displaced from each other in the rotation direction. In the first and second blade portions that are adjacent to each other along the rotation direction, the sum of the number of cutting edges of the outside blade and the cutting edge of the inside blade of the first blade is three or more, the sum of cutting edges of the outside blade and the cutting edge of the inside blade of the second blade is two or more, and the number of the cutting edge of the first blade is different from the number of the cutting edges of the second blade.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1(*b*) is a partially enlarged perspective view of FIG. 1(*a*);

FIG. 2(*a*) is a diagram as viewed from the front for explanatory illustration of the shape of the blade portions shown in FIGS. 1(*a*) and 1(*b*);

FIG. 2(*b*) is a diagram in plan view for explanatory illustration of the blade portions shown in FIGS. 1(*a*) and 1(*b*);

FIG. 2(*c*) is a diagram in side view for explanatory illustration of the blade portions shown in FIGS. 1(*a*) and 1(*b*);

FIG. 2(*d*) is a diagram for explanatory illustration of the blade portions shown in FIG. 2(*c*), in an overlapping manner;

FIG. 3(*b*) is an enlarged view showing the section indicated by arrow B in FIG. 2(*a*);

FIG. 3(*c*) is an enlarged view showing the section indicated by arrow C in FIG. 2(*a*);

FIG. 3(*d*) is an enlarged view showing the section indicated by arrow D in FIG. 2(*a*);

FIG. 3(*e*) is an enlarged view showing the section indicated by arrow E in FIG. 2(*b*);

FIG. 3(*f*) is an enlarged view showing the section indicated by arrow F in FIG. 2(*b*);

FIG. 7(*b*) is a plan view illustrating a hole cutter according to a second embodiment;

FIG. 7(*c*) is a plan view illustrating a hole cutter according to a third embodiment; and FIG. 7(*d*) is a plan view illustrating a hole cutter according to a fourth embodiment.

DETAILED DESCRIPTION OF THE PREFERRED EMBODIMENTS

A hole cutter according to a first embodiment of the present invention will now be described with reference to FIGS. 1 to 4.

Figure 1:
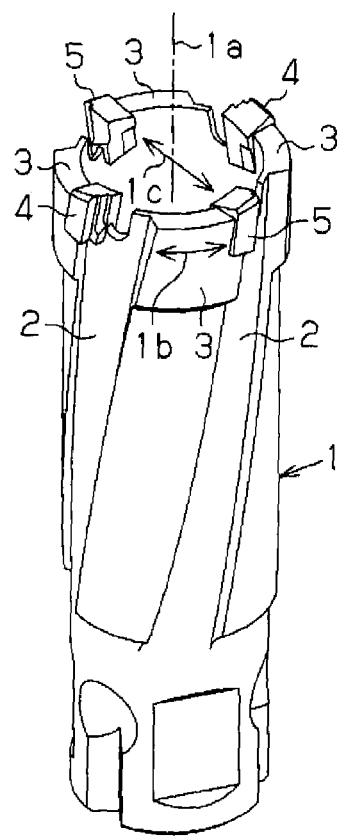
FIG. 1(*a*) is a perspective view illustrating a hole cutter according to a first embodiment.
Figure 1:
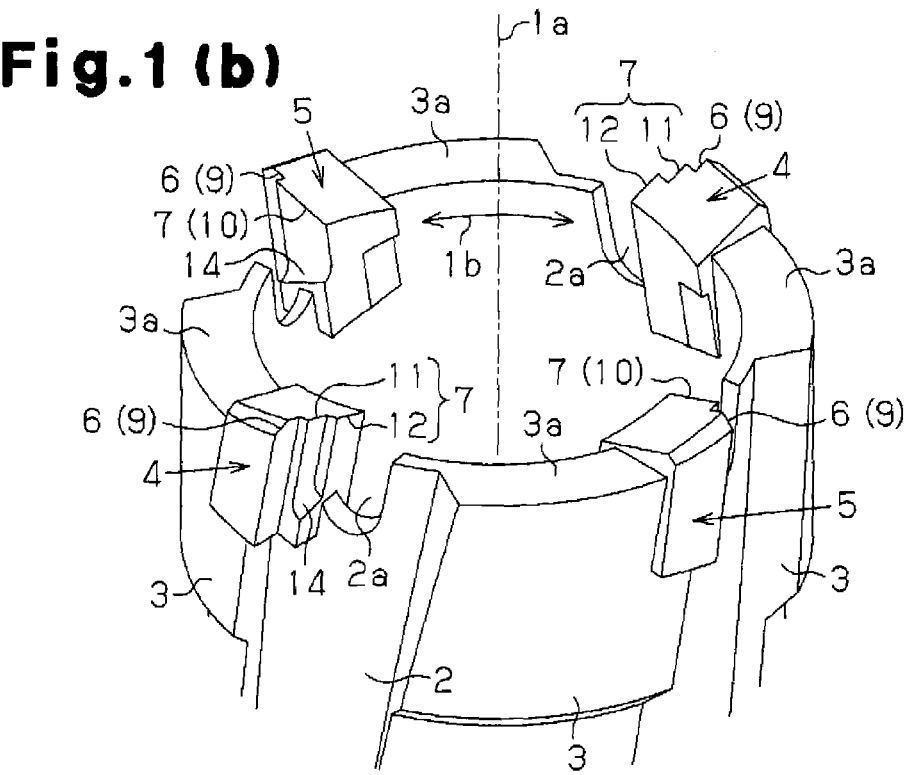
Figure 3A:
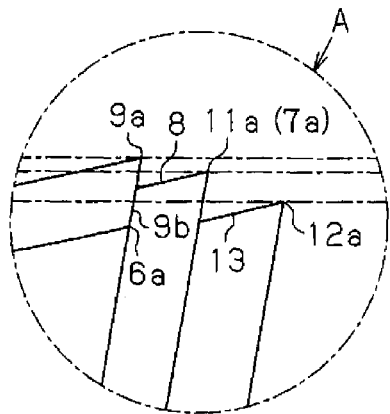
FIG. 3(*a*) is an enlarged view showing the section indicated by arrow A in FIG. 2(*a*)
Figure 3B:
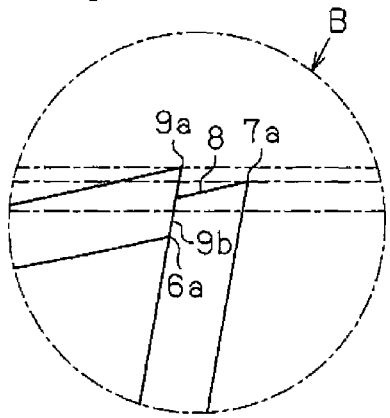
Figure 3C:
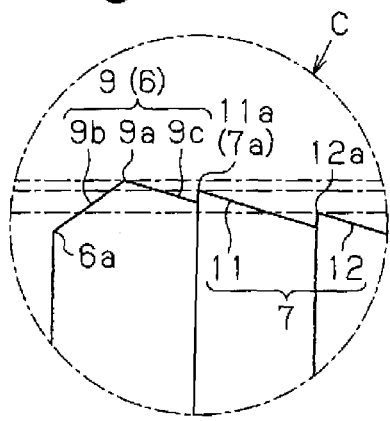
Figure 3D:
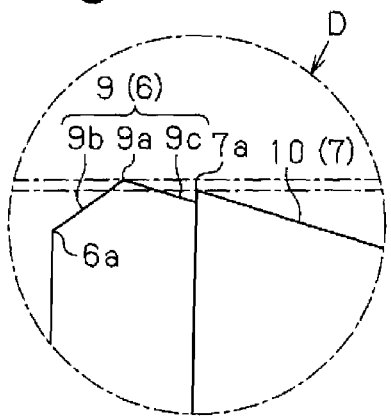
Figure 3E:
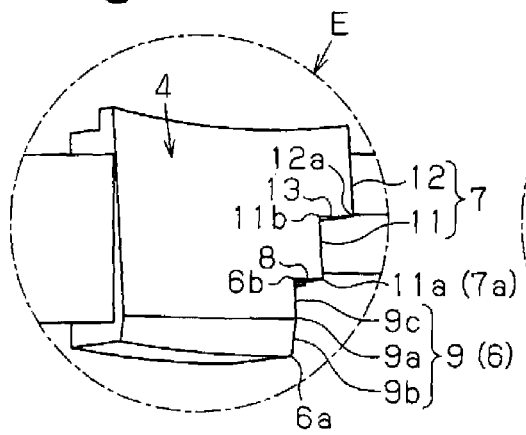
Figure 3F:
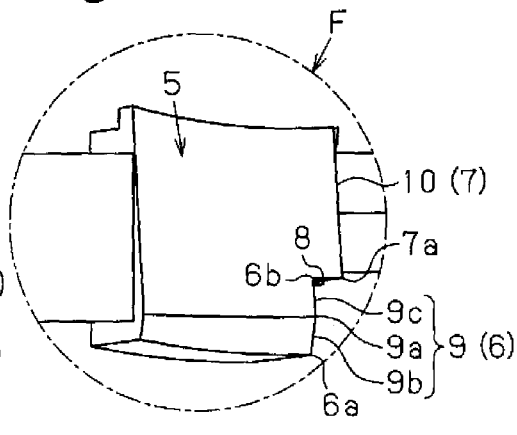

As shown in FIG. 1, a plurality of (four) blade bases 3 are arranged along a rotation direction 1*b* at the distal end of a blade cylinder 1, which has a circular cross section. A groove 2 extending in a direction along a rotation axis 1*a* is located between each adjacent pair of the blade bases 3. Two types of blade tips 4, 5 (blade portions) are attached to the distal end faces 3*a* of the blade bases 3, such that each blade tip 4, 5 is adjacent to the corresponding groove 2. The blade tips 4, 5 protrude inward and outward relative to the outer circumference of the distal end of the blade cylinder along the radial direction 1*c*. Two blade tips 4 and two blade tips 5 are alternately arranged along the rotation direction 1*b* at regular intervals. Notches 2*a* are formed in the outer circumference of the distal end of the blade cylinder 1. The notches 2*a* are each located between the blade tip 4, 5 and the blade base 3 so as to connect the interior of the blade cylinder 1 and the corresponding groove 2.

As shown in FIGS. 2(a) to 2(c), each of the blade tips 4, 5 has an outside blade 6 at a farther position from the rotation axis 1a, an inside blade 7 at a closer position to the rotation axis 1a, and a stepped cutting edge 8 connecting the blades 6 and 7 to each other. Each outside blade 6 and the corresponding inside blade 7 are arranged next to each other while being displaced in the rotation direction 1b with the stepped cutting edge 8 in between. Each outside blade 6 extends from an outermost pointed end 6a (see FIGS. 3a-4b) toward the rotation axis 1a. Each inside blade 7 extends toward the rotation axis 1a from an inside pointed end 7a (see FIGS. 3a-4b), which is located closer to the rotation axis 1a than the outermost pointed end 6a of the corresponding outside blade 6. Each stepped cutting edge 8 extends between a corner 6b formed at the inner end of the corresponding outside blade 6 and the inside pointed end 7a of the corresponding inside blade 7. The outside blade 6 and the inside blade 7 of each of the blade tips 4, 5 protrude relative to the distal end face 3a of the corresponding blade base 3 along the direction of the rotation axis 1a, so as to face the notch 2a of the corresponding groove 2.

As shown in FIGS. 2(a) to 2(c), and 3(a) to 3(f), a cutting edge 9 extends along the radial direction 1c on the outside blade 6 of each of the blade tips 4, 5 and has an angular shape. Each cutting edge 9 includes an outside cutting edge 9b extending from the outermost pointed end 6a to an apex 9a in the direction of the rotation axis 1a along the radial direction 1c, and an inside cutting edge 9c extending from the apex 9a to the corner 6b. The cutting edges 9 of the blade tips 4, 5 overlap with each other along the rotation direction 1b, and the rotational path of the cutting edges 9 of the outside blade 6 coincide with each other. The outside cutting edges 9b and the inside cutting edges 9c of the outside blades 6 of the blade tips 4, 5 are set to have the same clearance angle α and the same rake angle β.

In the inside blade 7 of each blade tip 5, a single cutting edge 10 extending along the radial direction 1c and the inside pointed end 7a are closer to the proximal end of the blade cylinder 1 in the direction of the rotation axis 1a than the apex 9a of the outside blade 6. The cutting edge 10 and the inside pointed end 7a are set to have the same clearance angle α and the same rake angle β as those of the outside cutting edge 9b and the inside cutting edge 9c in the outside blade 6. The inside cutting edge 9c of the outside blade 6 and the cutting edge 10 of the inside blade 7 are both inclined by the same inclination angle θ, so as to approach the proximal end of the blade cylinder 1 from the distal end as the distance from the outer end toward the inner end of the blade cylinder 1 increases.

The inside blade 7 of each blade tip 4 has an outside cutting edge 11 at a farther position from the rotation axis 1a, and an inside cutting edge 12 at a closer position to the rotation axis 1a. The outside cutting edge 11 and the inside cutting edge 12 are arranged next to each other while being displaced in the rotation direction 1b with a stepped cutting edge 13 in between. The outside cutting edge 11 extends toward the rotation axis 1a from an inside pointed end 11a that extends toward the stepped cutting edge 8 between the outside blade 6 and the inside blade 7. The inside cutting edge 12 extends toward the rotation axis 1a from an inside pointed end 12a, which is located closer to the rotation axis 1a than the inside pointed end 11a of the outside cutting edge 11. Each stepped cutting edge 13 extends between a corner 11b formed at the inner end of the corresponding outside cutting edge 11 and the inside pointed end 12a of the corresponding inside cutting edge 12. The outside cutting edges 11 and the inside cutting edges 12 of the inside blades 7 are located closer to the proximal end of the blade cylinder 1 in the direction of the rotation axis 1a than the apexes 9a of the outside blades 6. The outside cutting edge 11 and the inside cutting edge 12 are each set to have the same clearance angle α and the same rake angle β as those of the outside cutting edge 9b and the inside cutting edge 9c of the outside blade 6. The inside pointed end 12a of the inside cutting edge 12 is located closer to the proximal end of the blade cylinder 1 in the direction of the rotation axis 1a than the inside pointed end 11a of the outside cutting edge 11. The inside cutting edge 9c of the outside blade 6 and the outside cutting edge 11 and the inside cutting edge 12 of the inside blade 7 are all inclined by the same inclination angle θ, so as to approach the proximal end of the blade cylinder 1 from the distal end as the distance from the outer end toward the inner end of the blade cylinder 1 increases.

Each blade tip 5 has a step-shaped thick portion 14 located below the cutting edge 10 of the inside blade 7. The thick portion 14 faces the corresponding notch 2a and is inclined toward the corresponding groove 2. Each blade tip 4 has a step-shaped thick portion 14 located below the outside cutting edge 11 of the inside blade 7. The thick portion 14 faces the corresponding notch 2a and is inclined toward the corresponding groove 2. These thick portions 14 increase the thickness of the blade tips 4, 5 to increase the strength of the blade tips 4, 5.

In the blade tip 5 of each pair of the blade tips 4, 5 that are adjacent to each other along the rotation direction 1b, the number of cutting edge 10 of the inside blade 7 is one. In the blade tip 4, the number of the cutting edges 11, 12 of the inside blade 7 is two. In the blade tip 4, the sum of the number of the cutting edge 9 in the outside blade 6 and the number of the cutting edges 11, 12 in the inside blade 7 is three. In the blade tip 5, the sum of the number of the cutting edge 9 in the outside blade 6 and the number of the cutting edge 10 in the inside blade 7 is two. Of the outside cutting edge 11 and the inside cutting edge 12 of the inside blade 7 in each blade tip 4, the outside cutting edge 11 overlaps with the cutting edge 10 of the inside blade 7 in the blade tip 5 with respect to the rotation direction 1b, and the rotation path of the outside cutting edge 11 coincides with the cutting edge 10 of the inside blade 7 of each blade tip 5. The inside cutting edge 12 is displaced in the direction of the rotation axis 1a from the inner end of the cutting edge 10 of the inside blade 7 in the blade tip 5 by a displacement amount L.

When the blade cylinder 1 is applied to a workpiece and rotated, the blade tips 4, 5 of the blade cylinder 1 cut into the workpiece, and shavings are guided by the grooves 2 and the notches 2a to be discharged. After the cutting edges 9 of the outside blades 6 in the blade tips 4, 5 and the outside cutting edges 11 of the inside blades 7 in the blade tips 4, and the cutting edges 10 of the inside blades 7 in the blade tips 5 cut into the workpiece, the inside cutting edges 12 of the inside blades 7 in the blade tips 4 cut into the workpiece. Since it is displaced from the inside cutting edge 12 by the displacement amount L, the inner end of the cutting edge 10 of the inside blade 7 in each blade tip 5 insubstantially contributes to cutting operation. When the cutting of the workpiece is started, the cutting edges 12, 10 of the inside blades 7 contact the workpiece consecutively. This reduces the cutting resistance. The shavings are each divided into three strips by the cutting edge 9 of the outside blade 6, and the outside cutting edge 11 and the inside cutting edge 12 of the inside blade 7. Because of the displacement amount L, the shavings, which have been divided into three strips, tend to have varied thicknesses. When the blade tips 4, 5 of the blade cylinder 1 penetrate through the workpiece, a through hole is formed in the workpiece.

The first embodiment provides the following advantages.

(1) In the blade tips 4 of each pair of the blade tips 4, 5 that are adjacent to each other along the rotation direction 1*b*, the sum of the number of the cutting edge 9 in the outside blade 6 and the number of the cutting edges 11, 12 in the inside blade 7 is three. In the other blade tip 5, the sum of the number of the cutting edge 9 in the outside blade 6 and the number of the cutting edge 10 in the inside blade 7 is two. Accordingly, the shavings are cut into three strips. Compared to the prior art hole cutter, which cuts shavings into only two strips, the hole cutter of the present embodiment can more smoothly discharge shavings.

(2) Of the cutting edges 11, 12 of the inside blade 7 in each blade tip 4, the outside cutting edge 11 overlaps with the cutting edge 10 of the inside blade 7 in the blade tip 5 along the rotation direction 1*b*. In contrast, the inside cutting edge 12 of the inside blade 7 in each blade tip 4 is displaced in the direction of the rotation axis 1*a* from the cutting edge 10 of the inside blade 7 in the blade tip 5 by the displacement amount L. This structure reduces the cutting resistance when the cutting of a workpiece is started, and shavings are smoothly discharged while being cut into three strips having different thicknesses.

(3) The outside blade 6 and the inside blade 7 of the blade tips 4, 5 have the same clearance angle α, the rake angle, and the inclination angle θ. Therefore, the blade tips 4, 5 are easily cut and polished. Also, the cutting resistance is reduced.

(4) Since the outside blades 6 of the blade tips 4, 5 each have an angular shape, the outside blades 6 are prevented from being broken at the start of cutting operation.

Other than the above described first embodiment, the present invention may be embodied in the following manners.

Figure 4A:
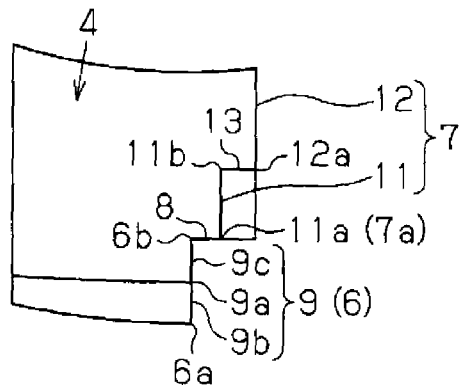
FIG. 4 includes diagrams in plan view for explanatory illustration of the blade portions shown in FIG. 2(*b*)
Figure 4B:
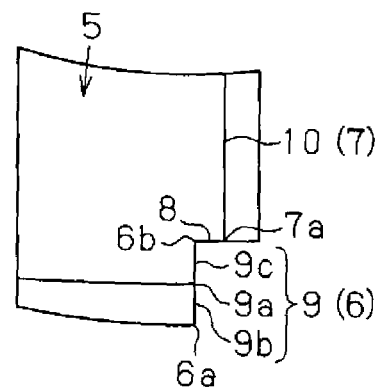

In the first embodiment shown in FIG. 4, the number of the cutting edge 9 of the outside blade 6 in each of the blade tips 4, 5 is one, the number of the cutting edge 10 of the inside blade 7 in the blade tip 5 is one, and the number of the cutting edges 11, 12 of the inside blade 7 in the blade tip 4 is two.

Figure 5A:
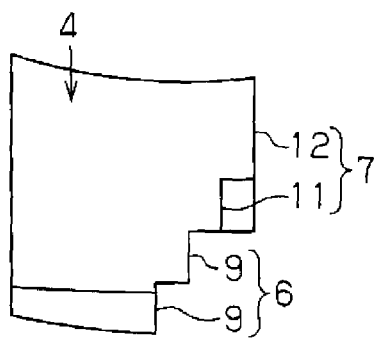
FIGS. 5(*a*) and 5(*b*) are diagrams in plan view for explanatory illustration of blade portions according to a first modification of the first embodiment.
Figure 5B:
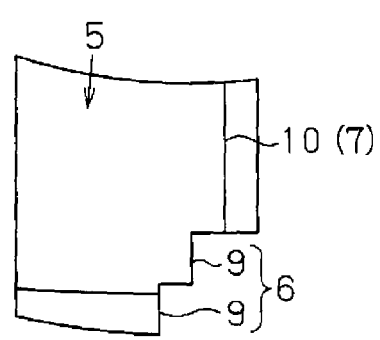

In a first modification of the first embodiment shown in FIG. 5, the number of cutting edges 9 in the outside blade 6 in each of the blade tips 4, 5 is two. The number of the cutting edge 10 of the inside blade 7 in the blade tip 5 is one. The number of the cutting edges 11, 12 of the inside blade 7 in the blade tip 4 is two. In the blade tip 4, the sum of the number of the cutting edges 9 in the outside blade 6 and the number of the cutting edges 11, 12 in the inside blade 7 is four. In the blade tip 5, the sum of the number of the cutting edges 9 in the outside blade 6 and the number of the cutting edge 10 in the inside blade 7 is three.

Figure 6A:
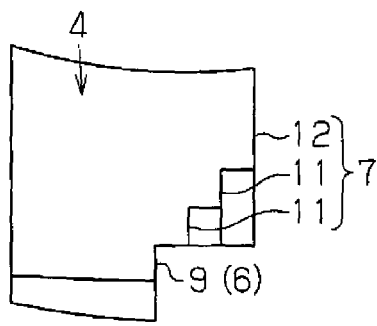
FIGS. 6(*a*) and 6(*b*) are diagrams in plan view for explanatory illustration of blade portions according to a second modification of the first embodiment.
Figure 6B:
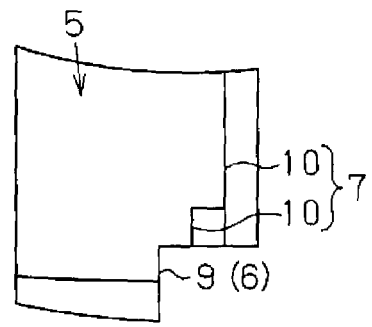
Figure 7A:
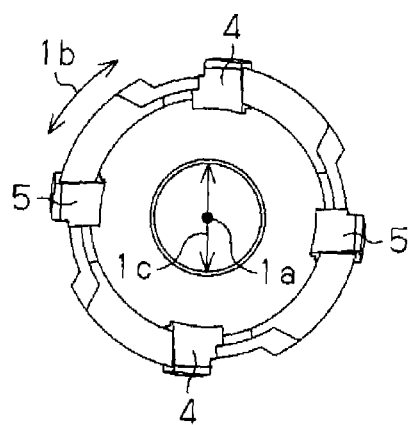
FIG. 7(*a*) is a plan view illustrating the hole cutter according to the first embodiment.
Figure 7B:
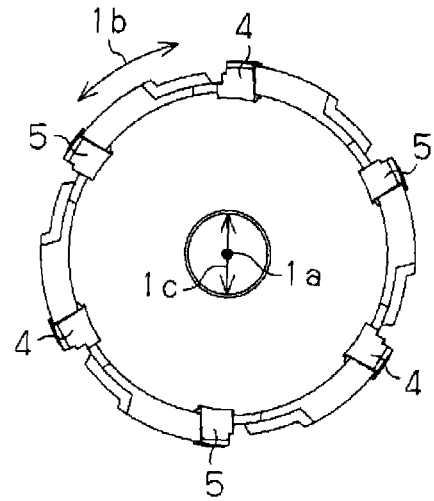
Figure 7C:
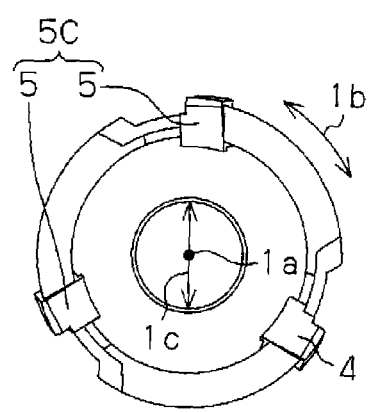
Figure 7D:
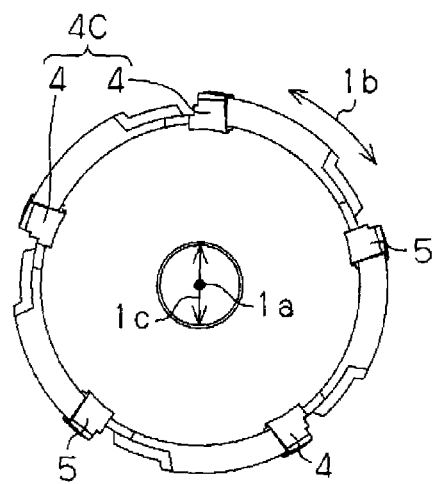

In a second modification of the first embodiment shown in FIG. 6, the number of cutting edge 9 in the outside blade 6 in each of the blade tips 4, 5 is one. The number of the cutting edges 10 of the inside blade 7 in the blade tip 5 is two. The number of the cutting edges 11, 12 of the inside blade 7 in the blade tip 4 is three. In the blade tip 4, the sum of the number of the cutting edges 9 in the outside blade 6 and the number of the cutting edges 11, 12 in the inside blade 7 is four. In the blade tip 5, the sum of the number of the cutting edge 9 in the outside blade 6 and the number of the cutting edges 10 in the inside blade 7 is three.

As long as the following two conditions are met, the number of the cutting edges of the blade tips 4, 5 may be any number other than those in the modifications of FIGS. 5 and 6. (1) The number of the cutting edges of one of the blade tips 4, 5 is three or more, and the number of the cutting edges of the other blade tip is two or more. (2) The number of the cutting edges of one of the blade tips 4, 5 is different from the number of the cutting edges of the other blade tip.

In the first embodiment shown in FIG. 7(*a*), the four, or an even number of, blade tips 4, 5 are alternately arranged along the rotation direction 1*b* at regular intervals. Specifically, two blade tips 4 and two blade tips 5 are provided.

In a second embodiment shown in FIG. 7(*b*), six, or an even number of, blade tips 4, 5 are alternately arranged along the rotation direction 1*b* at regular intervals. Specifically, three blade tips 4 and three blade tips 5 are provided.

In a third embodiment shown in FIG. 7(*c*), three, or an odd number of, blade tips 4, 5 are arranged along the rotation direction 1*b* at regular intervals. Specifically, one blade tip 4 and two blade tips 5 are provided. The two blade tips 5 form a blade tip group 5C (blade portion). In the blade portion group 5C, edges 6, 7, which overlap with each other in the rotation direction 1*b*, are arranged to be adjacent to each other along the rotation direction 1*b*. The blade tips 4, 5 may be arranged such that the two blade tips 5 are adjacent to each other.

In a fourth embodiment shown in FIG. 7(*d*), five, or an odd number of, blade tips 4, 5 are arranged along the rotation direction 1*b* at regular intervals. Specifically, three blade tip 4 and two blade tip 5 are provided. The two blade tips 4 form a blade tip group 4C (blade portion). In the blade portion group 4C, edges 6, 7, which overlap with each other in the rotation direction 1*b*, are arranged to be adjacent to each other along the rotation direction 1*b*. The blade tips 4, 5 may be arranged such that the two blade tips 4 are adjacent to each other.

Therefore, the present examples and embodiments are to be considered as illustrative and not restrictive and the invention is not to be limited to the details given herein, but may be modified within the scope and equivalence of the appended claims.

The invention claimed is:

1. A hole cutter comprising:
   a blade cylinder having a circular cross section, the blade cylinder having a rotation axis and a distal end; and
   at least one first blade portion and at least one second blade portion located at the distal end of the blade cylinder, the first and second blade portions are arranged along the rotation direction at intervals;
   each of the first and second blade portions including:
   an inside blade formed at a closer position to the rotation axis;
   an outside blade formed at a farther position from the rotation axis than the inside blade, the outside blade being displaced in the rotation direction relative to the inside blade; and
   a stepped cutting edge connecting the outside blade and the inside blade to each other,
   wherein each of the outside blade and the inside blade has one cutting edge that extends along a radial direction or a plurality of cutting edges that extend along the radial direction and are displaced from each other in the rotation direction,
   wherein, in the first and second blade portions that are adjacent to each other along the rotation direction, the sum of the number of cutting edges of the outside blade and the inside blade of the first blade portion is three or more, the sum of cutting edges of the outside blade and the second blade portion is two or more, the number of the cutting edges of the first blade being different from the number of the cutting edges of the second blade portion, and
   wherein an odd number of the first blade portions and an even number of the second blade portions are arranged along the rotation direction, and the arrangement of the first and second blade portions includes a part in which two of the first blade portions or two of the second blade portions are arranged adjacent to each other.

2. The hole cutter according to claim 1, wherein:
in each of the first and second blade portions:
the outside blade has an outermost pointed end located at the outermost position and extends from the outermost pointed end toward the rotation axis;
the inside blade has an inside pointed end that is located a position closer to the rotation axis than the outermost pointed end of the outside blade, and extends toward the rotation axis from the inside pointed end;
the stepped cutting edge extends between a corner formed at the inner end of the outside blade and the inside pointed end of the inside blade; and
the outside blade and the inside blade are displaced from each other in the rotation direction with the stepped cutting edge in between,
in each of the first and second blade portions, the outside blade has either a single cutting edge, which extends along the radial direction, or a plurality of cutting edges, which extend along the radial direction and are displaced from each other in the rotation direction;
in each of the first and second blade portions, the inside blade has either a single cutting edge, which extends along the radial direction, or a plurality of cutting edges, which extend along the radial direction and are displaced from each other in the rotation direction; and
in the first and second blade portions that are adjacent to each other along the rotation direction, the cutting edge of the inside blade of the first blade portion includes a cutting edge that is displaced in the direction of the rotation axis from the cutting edge of the inside blade of the second blade portion.

3. The hole cutter according to claim 2, the inside pointed end of the inside blade being a first inside pointed end and the stepped cutting edge being a first stepped cutting edge, wherein:
in each of the first and second blade portions, the number of the cutting edge-edges of the outside blade is one;
in each of the first and second blade portions that are adjacent to each other along the rotation direction, the number of the cutting edges of the inside blade of the first blade portion is two, and the number of the cutting edges of the inside blade of the second blade portion is one;
in the first blade portion, the sum of the number of the cutting edges of the outside blade and the number of the cutting edges of the inside blade is three;
in the second blade portion, the sum of the number of the cutting edges of the outside blade and the number of the cutting edges of the inside blade is two;
each cutting edge of the inside blade in the first blade portion includes:
an outside cutting edge located on the outside;
an inside cutting edge located inside of the outside cutting edge; and
a second stepped cutting edge connecting the outside cutting edge and the inside cutting edge to each other,
the outside cutting edge has an inside pointed end that is continuous to the first stepped cutting edge between the outside blade and the inside blade, and extends toward the rotation axis from the inside pointed;
the inside cutting edge has a second inside pointed end that is located at a position closer to the rotation axis than the first inside pointed end of the outside cutting edge, and the inside cutting edge extending toward the rotation axis from the second inside pointed end;

the second stepped cutting edge extends between a corner formed at the inner end of the inside cutting edge and the first inside pointed end of the outside cutting edge;
the inside cutting edge and the outside cutting edge are displaced from each other in the rotation direction with the second stepped cutting edge in between;
the outside cutting edge of the inside blade in the first blade portion overlaps in the rotation direction with the cutting edge of the inside blade in the second blade portion; and
the inside cutting edge of the inside blade in the first blade portion is displaced in the direction of the rotation axis from the cutting edge of the inside blade in the second blade portion.

4. The hole cutter according to claim 3, wherein:
in the first blade portion, the first inside pointed end of the outside cutting edge of the outside blade is located closer to a proximal end of the blade cylinder in the direction of the rotation axis than the apex with respect to the direction of the rotation axis in the cutting edge of the outside blade, and the second inside pointed end of the inside cutting edge of the inside blade is located closer to the proximal end of the blade cylinder in the direction of the rotation axis than the first inside pointed end of the outside cutting edge of the inside blade; and
in the second blade portion, the second inside pointed end of the cutting edge of the inside blade is located closer to the proximal end of the blade cylinder in the direction of the rotation axis than the apex with respect to the direction of the rotation axis in the cutting edge of the outside blade.

5. The hole cutter according to claim 3, wherein, in each of the first and second blade portions, the cutting edge of the outside blade has an angular shape with an apex and includes an outside cutting edge and an inside cutting edge, the outside cutting edge extending in the radial direction from the outermost pointed end to the apex with respect to the direction of the rotation axis, and the inside cutting edge extending in the radial direction from the apex to the corner.

6. The hole cutter according to claim 5, wherein:
in the first blade portion, the inside cutting edge of the outside blade and the outside and inside cutting edges of the inside blade are inclined by the same inclination angle such that these cutting edges are inclined by the same inclination angle so as to approach the proximal end of the blade cylinder from the distal end as the distance from the outer end toward the inner end of the blade cylinder increases; and
in the second blade portion, the inside cutting edge of the outside blade and the cutting edge of the inside blade are inclined by the same inclination angle such that these cutting edges are inclined by the same inclination angle so as to approach the proximal end of the blade cylinder from the distal end as the distance from the outer end toward the inner end of the blade cylinder increases.

7. The hole cutter according to claim 5, wherein the outside cutting edge and the inside cutting edge of the outside blade in the first and second blade portions, the inside cutting edge and the outside cutting edge of the inside blade in the first blade portion, and the cutting edge of the inside blade in the second blade portion are formed to have the same clearance angle.

8. The hole cutter according to claim 5, wherein the outside cutting edge and the inside cutting edge of the outside blade in the first and second blade portions, the inside cutting edge and the outside cutting edge of the inside blade in the first blade portion, and the cutting edge of the inside blade in the second blade portion are formed to have the same rake angle.

9. The hole cutter according to claim 1, wherein the blade cylinder has a plurality of grooves extending along the direction of the rotation axis and a plurality of blade base that are arranged alternately with the grooves along the rotation direction, the first and second blade portions each being a blade tip that is attached to the distal end face of one of the blade bases with the inside and outside blades located adjacent to the corresponding groove.

* * * * *